United States Patent
Huang et al.

(10) Patent No.: US 11,086,881 B2
(45) Date of Patent: Aug. 10, 2021

(54) METHOD AND DEVICE FOR ANALYZING DATA

(71) Applicant: INDUSTRIAL TECHNOLOGY RESEARCH INSTITUTE, Hsinchu (TW)

(72) Inventors: Hsin-Chien Huang, Tainan (TW); Hung-Hsuan Chen, New Taipei (TW); Wen Tsui, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 389 days.

(21) Appl. No.: 14/957,595

(22) Filed: Dec. 2, 2015

(65) Prior Publication Data
US 2017/0083583 A1    Mar. 23, 2017

(30) Foreign Application Priority Data
Sep. 23, 2015   (TW) .................................. 104131381

(51) Int. Cl.
*G06F 17/00* (2019.01)
*G06F 16/2457* (2019.01)
*G06F 16/28* (2019.01)

(52) U.S. Cl.
CPC ........ *G06F 16/2457* (2019.01); *G06F 16/283* (2019.01)

(58) Field of Classification Search
None
See application file for complete search history.

(56) References Cited

U.S. PATENT DOCUMENTS 5,832,482 A    11/1998   Yu et al.
6,931,612 B1 *  8/2005   Potkonjak ........... G06F 17/5045
                                                     716/117
(Continued)

FOREIGN PATENT DOCUMENTS

CN    101118618 A    2/2008
CN    101441645 A    5/2009
(Continued)

OTHER PUBLICATIONS

Taiwanese Office Action dated Mar. 24, 2016.
(Continued)

*Primary Examiner* — Tuankhanh D Phan
(74) *Attorney, Agent, or Firm* — Rabin & Berdo, P.C.

(57) ABSTRACT

A method and a device for analyzing data are provided. The method includes following steps. A plurality of queries for an event stored in a database are integrated to obtain a plurality of features. Each feature is limited at a searching condition. A plurality of items of searched data are obtained from the database according to respective searching condition of each feature. Whether a data volume of the searched data is higher or lower than a predetermined range is determined. If the data volume is higher than the predetermined range, the data volume of the searched data is reduced according to the features. If the data volume is lower than the predetermined range, the data volume of the searched data is increased according to the features. A correlation between the features and the event is analyzed according to the searched data.

16 Claims, 5 Drawing Sheets

(56) References Cited

U.S. PATENT DOCUMENTS

| | | | |
|---|---|---|---|
| 7,836,051 | B1 | 11/2010 | Mason |
| 7,904,355 | B1 | 3/2011 | Johnson |
| 8,200,687 | B2 | 6/2012 | Gupta |
| 8,412,598 | B2 | 4/2013 | Early et al. |
| 9,020,926 | B1* | 4/2015 | Allon ............... G06F 17/30648 707/708 |
| 2002/0069218 | A1* | 6/2002 | Sull ..................... G11B 27/034 715/202 |
| 2011/0208776 | A1 | 8/2011 | Lee et al. |
| 2011/0307437 | A1 | 12/2011 | Aliferis et al. |
| 2014/0156628 | A1 | 6/2014 | Raichelgauz et al. |
| 2014/0214883 | A1* | 7/2014 | Sanderson ........... G06F 16/245 707/769 |
| 2014/0280257 | A1 | 9/2014 | Aliferis et al. |
| 2014/0289174 | A1 | 9/2014 | Statnikov et al. |
| 2015/0094983 | A1 | 4/2015 | Wang et al. |
| 2015/0161208 | A1* | 6/2015 | Yoshioka ............ G06F 16/3331 707/771 |
| 2016/0063094 | A1* | 3/2016 | Udupa .................. G06F 17/277 707/748 |

FOREIGN PATENT DOCUMENTS

| | | | |
|---|---|---|---|
| CN | 101751400 | A | 6/2010 |
| CN | 101814085 | A | 8/2010 |
| CN | 102298729 | A | 12/2011 |
| CN | 102576360 | A | 7/2012 |
| CN | 102930025 | A | 2/2013 |
| CN | 103116649 | A | 5/2013 |
| CN | 103577429 | A | 2/2014 |
| CN | 103678402 | A | 3/2014 |
| CN | 104090901 | A | 10/2014 |
| CN | 104679884 | A | 6/2015 |
| CN | 104750681 | A | 7/2015 |
| CN | 104794003 | A | 7/2015 |
| CN | 104834730 | A | 8/2015 |
| KR | 20140021934 | A | 2/2014 |
| KR | 20150096005 | A | 8/2015 |
| TW | 200951860 | A | 12/2009 |
| TW | 201403353 | A | 1/2014 |
| TW | M491908 | U | 12/2014 |
| TW | I472936 | B | 2/2015 |
| TW | 201516718 | A | 5/2015 |

OTHER PUBLICATIONS

Hsinchun Chen et al., "Business Intelligence and Analytics: From Big Data to Big Impact", MIS Quarterly vol. 36 No. 4, pp. 1165-1188/Dec. 2012.

Shohei Shimizu et al., "A Linear Non-Gaussian Acyclic Model for Causal Discovery", Journal of Machine Learning Research 7, pp. 2003-2030, Oct. 2006.

Patrik O. Hoyer at al., "Nonlinear causal discovery with additive noise models", Advances in Neural Information Processing Systems 21 (NIPS 2008).

Sargur N. Srihari et al., "Big Data, Machine Learning, Causal Models", proceedings of Int. Conf. on Signal and Image Processing, Bangalore, Jan. 2014.

Vasant Dhar, "Big data promises automated actionable knowledge creation and predictive models for use by both humans and computers", vol. 56 | No. 12, communications of the acm, december 2013.

Justin Grimmer, "We Are All Social Scientists Now: How Big Data, Machine Learning, and Causal Inference Work Together", American Political Science Association, Jan. 2015.

Liran Einav et al., "The Data Revolution and Economic Analysis", National Bureau of Economic Research, May 2013.

Danyel Fisher et al., "Interactions with Big Data Analytics", DOI: 10.1145/2168931.2168943 © 2012 ACM 1072-5220/12/05, Jun. 2012.

Chinese Office Action dated Jul. 24, 2019.
Chinese Office Action dated Nov. 27, 2020.

* cited by examiner

METHOD AND DEVICE FOR ANALYZING DATA

This application claims the benefit of Taiwan application Serial No. 104131381, filed Sep. 23, 2015, the disclosure of which is incorporated by reference herein in its entirety.

TECHNICAL FIELD

The disclosure relates in general to a method and a device for analyzing data.

BACKGROUND

Along with the development in information technology, various industries such as cloud computing and e-commerce are developed. These industries normally involve the analysis of megadata and need to perform data sensor mining to find out major factors affecting a particular event. The analysis of megadata is a big challenge to the industries. The system needs to search various features and obtain a large volume of data for analysis. However, such method is inefficient and causes a great burden to the system.

SUMMARY

The disclosure is directed to a method and a device for analyzing data.

According to one embodiment, a method for analyzing data is provided. The method includes the following steps. A plurality of queries for an event stored in a database are integrated to obtain a plurality of features. Each feature is limited at a searching condition. A plurality of items of searched data are obtained from the database according to respective searching condition of each feature. Whether a data volume of the searched data is higher or lower than a predetermined range is determined. If the data volume is higher than the predetermined range, the data volume of the searched data is reduced according to the features. If the data volume is lower than the predetermined range, the data volume of the searched data is increased according to the features. A correlation between the features and the event is analyzed according to the searched data.

According to another embodiment, a system for analyzing data is provided. The system includes a database, a user interface, an arithmetic unit and an analysis unit. The user interface is for receiving a plurality of queries for an event from the user. The arithmetic unit is connected between the database and the user interface for integrating the queries to obtain a plurality of features. Each feature is limited at a searching condition. A plurality of items of searched data are obtained from the database according to respective searching condition of each feature. If the data volume is higher than a predetermined range, the arithmetic unit reduces the data volume of the searched data according to the features. If the data volume is lower than the predetermined range, the arithmetic unit increases the data volume of the searched data according to the features. The analysis unit is connected between the database and the arithmetic unit for analyzing a correlation between the features and the event according to the searched data.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 8 is another schematic diagram of reducing the data volume of the searched data.

FIG. 9 is a schematic diagram of increasing the data volume of the searched data.

FIG. 10 is another schematic diagram of increasing the data volume of the searched data.

Figure 1:
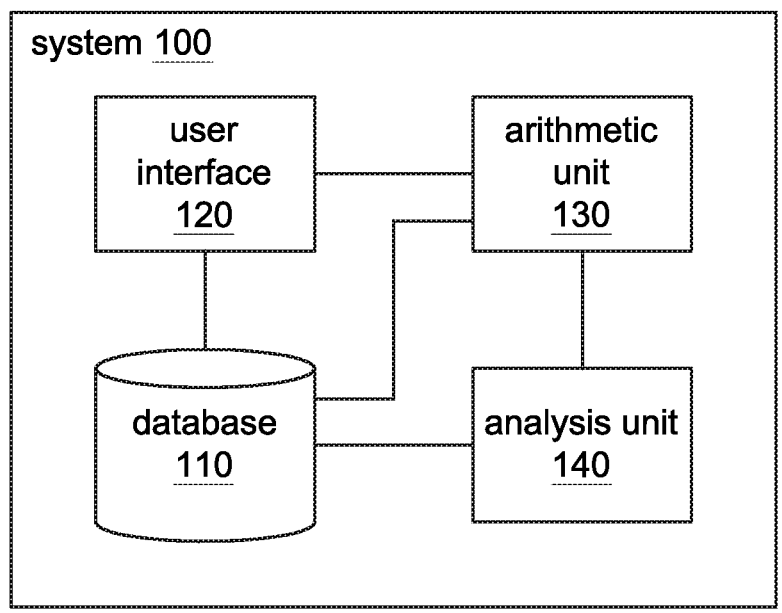
FIG. 1 is a schematic diagram of a system for analyzing data.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a system 100 for analyzing data is shown. The system 100 is for analyzing megadata and performing data sensor mining to find out major factors affecting a particular event. For example, in the wafer manufacturing process, the conformity rate is affected by many factors. In order to find out the major factors affecting the conformity rate, a number of sensors, such as temperature sensors or pressure sensors, are disposed on the apparatus. Major factors affecting the conformity rate can be obtained through data sensor mining and used as a basis for the settings of the apparatus. Similarly, in other application fields, the 100 for analyzing data can perform data sensor mining on students' various data to obtain major factors affecting their marks in mathematics. Or, when the revenue from e-commerce increases dramatically, data sensor mining can be performed on various business data to find out major factors.

The system 100 for analyzing data includes a database 110, a user interface 120, an arithmetic unit 130 and an analysis unit 140. The database 110 is for storing various types of data, and can be realized by such as a memory, a hard disc, a cloud storage device, a memory card or an optical disc. The user interface 120 is for a user to input various types of information and can be realized by such as a keyboard or a touch screen. The arithmetic unit 130 connected between the database 110 and the user interface 120 is for performing a data computing procedure or a determination procedure. The analysis unit 140 connected between the database 110 and the arithmetic unit 130 is for performing an analysis procedure or a determination procedure. The arithmetic unit 130 and the analysis unit 140 respectively can be realized by an integrated circuit (IC), a circuit board or a storage medium storing a plurality of programming codes. The arithmetic unit 130 and the analysis unit 140 can be realized by two independent units or can be integrated into one unit.

When data volume is huge, data sensor mining will become very difficult. The process of data sensor mining performed on a large volume of data by the system 100 is disclosed below with an accompanying flowchart.

Figures 2, 3:
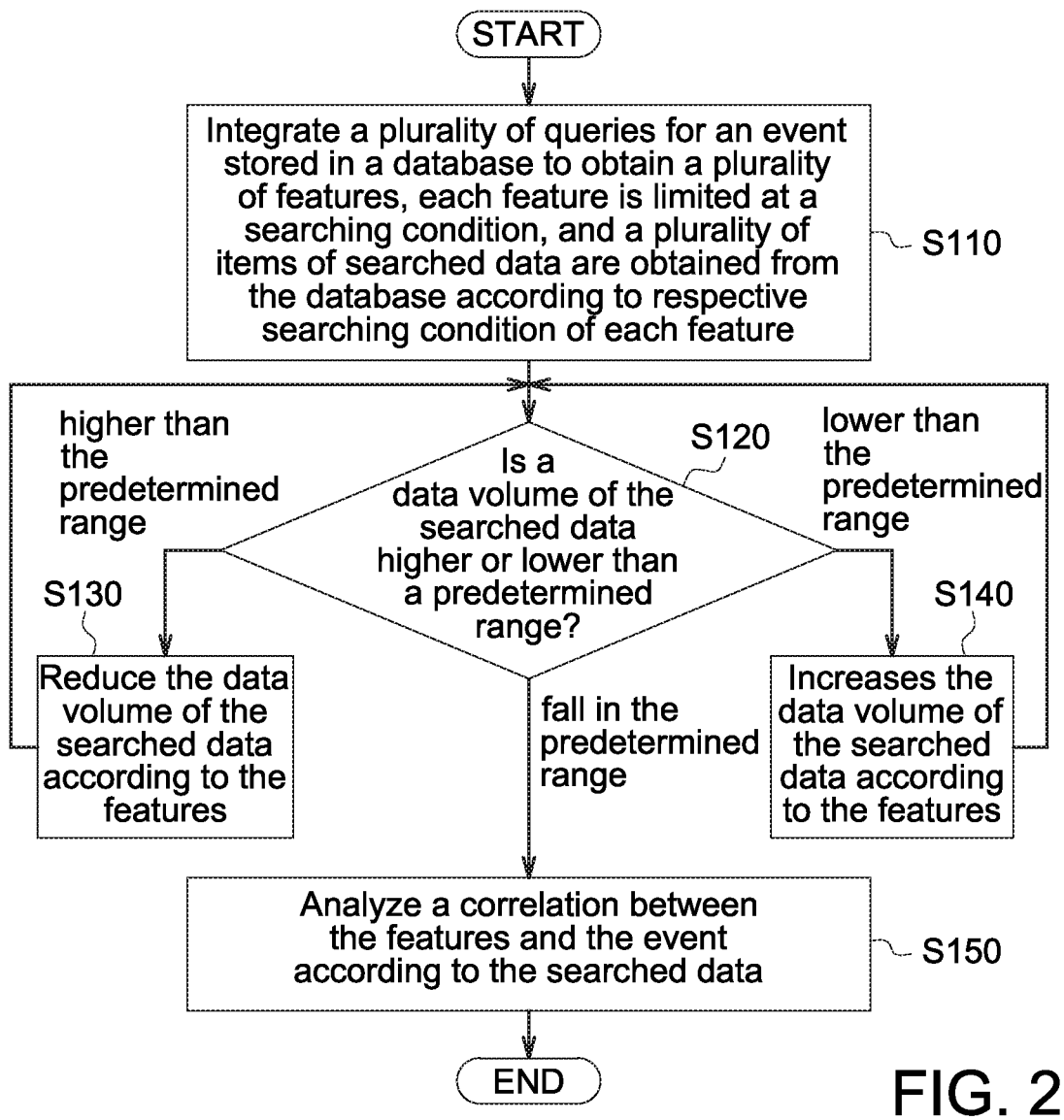
FIG. 2 is a flowchart of a method for analyzing data.
FIG. 3 is a schematic diagram of several items of data.

Referring to FIG. 2, a flowchart of a method for analyzing data is shown. In an embodiment, the database 110 stores a large volume of data. The user interface 120 is for the user to input a plurality of queries for an event to find out major factors affecting the event. Referring to FIG. 3, a schematic diagram of several items of data is shown. Each item of data records the contents of features N1 to N10. In another embodiment, the data can be denoted in the form of tree chart or radar chart. For example, when one user wants to inquire major factors causing dramatic increase in the revenue of e-commerce, this user can input features such as "Commodity Price" and "Place of Purchase", and further limit the feature "Commodity Price" at the searching condition "More Than $1000" and limit the feature "Place of Purchase" at the searching condition "Taipei City". When another user wants to inquire major factors causing dramatic increase in the revenue of e-commerce, this user can input features such as "Weather" and "Print Ads Amount", and further limit the feature "Weather" at the searching condition "Rainy" and the feature "Print Ads Amount" at the searching condition "More Than $300,000". The queries can be inputted by the same user or by different users. The queries are stored in the database 110.

Figure 4A:
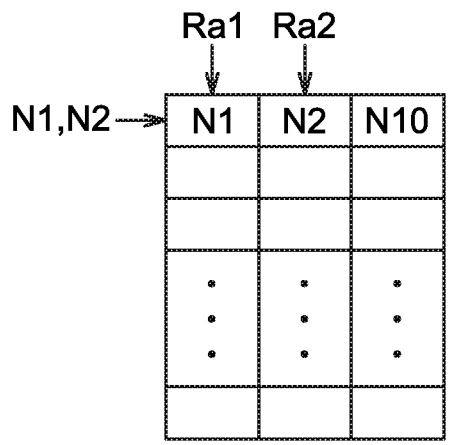
FIGS. 4A to 4C are schematic diagrams of three queries for searching factors affecting a particular feature.
Figure 4B:
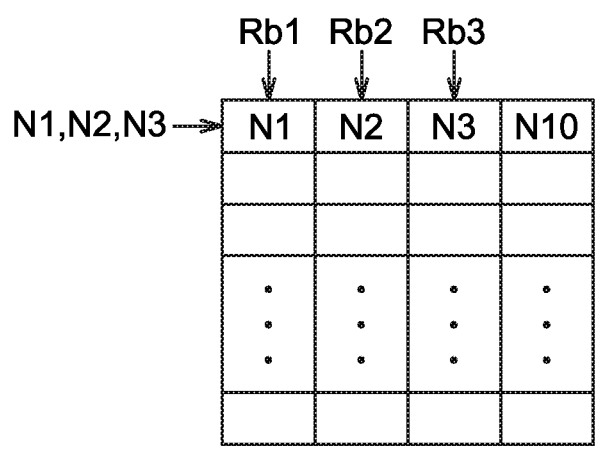
Figure 4C:
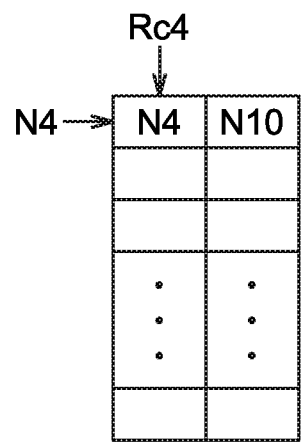

In step S110, the arithmetic unit 130 integrates a plurality of queries for an event stored in the database 110 to obtain a plurality of searched features. Referring to FIGS. 4A to 4C, schematic diagrams of three queries for the factors affecting a particular feature N10 are shown. In the first query as indicated in FIG. 4A, feature N1 and N2 are respectively limited at searching conditions Ra1 and Ra2. In the second query as indicated in FIG. 4B, features N1, N2 and N3 are respectively limited at searching conditions Rb1, Rb2 and Rb3. In the third query as indicated in FIG. 4C, feature N4 is limited at searching condition Rc4.

Figure 5:
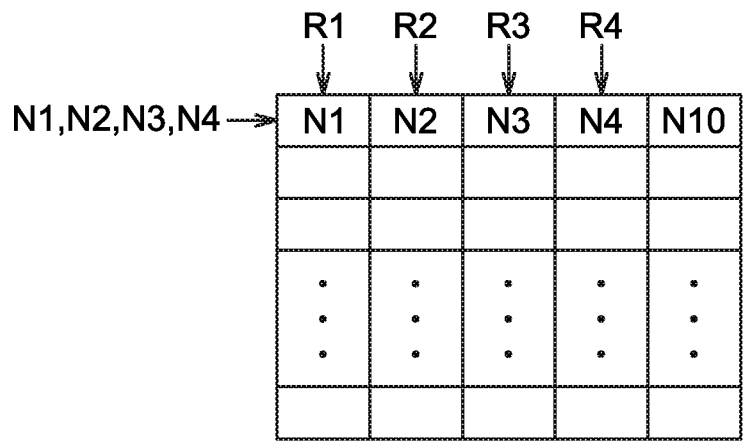
FIG. 5 is an integration schematic diagram of the queries of FIGS. 4A to 4C.

Referring to FIG. 5, an integration schematic diagram of the queries of FIGS. 4A to 4C is shown. The arithmetic unit 130 integrates three queries of FIGS. 4A to 4C to obtain features N1, N2, N3, and N4. The features N1, N2, N3, and N4 are respectively limited at searching conditions R1, R2, R3, and R4. In an embodiment, the queries can be integrated through the union of all features and any feature used in at least one query is selected. In another embodiment, the queries can be integrated through the intersection of all features and any feature used in all queries is selected. Besides, the first query and the second query both contain feature N1, and the searching condition R1 of the feature N1 can be a union of searching conditions Ra1 and Rb1. In another embodiment, the searching condition R1 of the feature N1 can be an intersection of the searching conditions Ra1 and Rb1. In an embodiment indicated in FIG. 5, the features N1, N2, N3 and N4 are integrated as a union thereof, and the searching conditions R1, R2, R3 and R4 are integrated as a union thereof. A plurality of items of searched data are obtained from the database 120 according to the searching conditions R1, R2, R3 and R4 of the features N1, N2, N3 and N4 respectively.

In step S120, the arithmetic unit 130 determines whether a data volume of the searched data is higher or lower than a predetermined range. If the data volume is higher than the predetermined range, the method proceeds to step S130. In step S130, a data shrink procedure is performed. If the data volume is lower than the predetermined range, the method proceeds to step S140. In step S140, a data expand procedure is performed. If the data volume falls in the predetermined range, the method proceeds to step S150. The predetermined range is determined according to the computing capability of the system 100, and shall not go beyond the limit of the computing capability. For example, the predetermined range is between 10,000 to 20,000 items of data.

In step S130, the data volume of the searched data is reduced according to the features. Different methods can be used in step S130 to reduce the data volume, and details of these methods are disclosed below.

Figure 6:
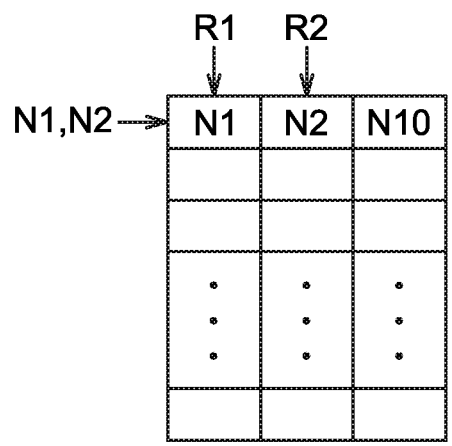
FIG. 6 is a schematic diagram of reducing the data volume of the searched data.

In an embodiment, the arithmetic unit 130 can eliminate some features to reduce the data volume according to the number of times of each of the features used in the queries. Referring to FIG. 6, a schematic diagram of reducing the data volume of the searched data is shown. As indicated in FIG. 5, features N1, N2, N3 and N4 are used in the queries. In the first query to the third query, the features N1 and N2 both are used twice, and the features N3 and N4 both are used once. Therefore, the features N3 and N4 having a lower frequency of use are eliminated and the features N1 and N2 are selected. Since only the searched data satisfying the searching condition R1 of the feature N1 or the searching condition R2 of the feature N2 are left, the data volume is effectively reduced.

Figure 7:
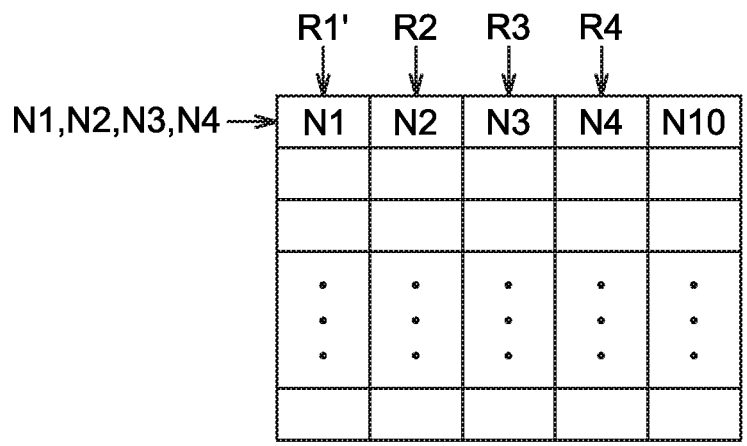
FIG. 7 is another schematic diagram of reducing the data volume of the searched data.

In another embodiment, the arithmetic unit 130 can narrow the searching condition to reduce the data volume. Referring to FIG. 7, another schematic diagram of reducing the data volume of the searched data is shown. The arithmetic unit 130 can narrow the searching condition R1 of the feature N1 as the searching condition R1'. For example, the searching condition "More Than $300,000" can be narrowed as "More Than $500,000", such that the data volume of the searched data can be effectively reduced.

Figures 8, 9, 10:
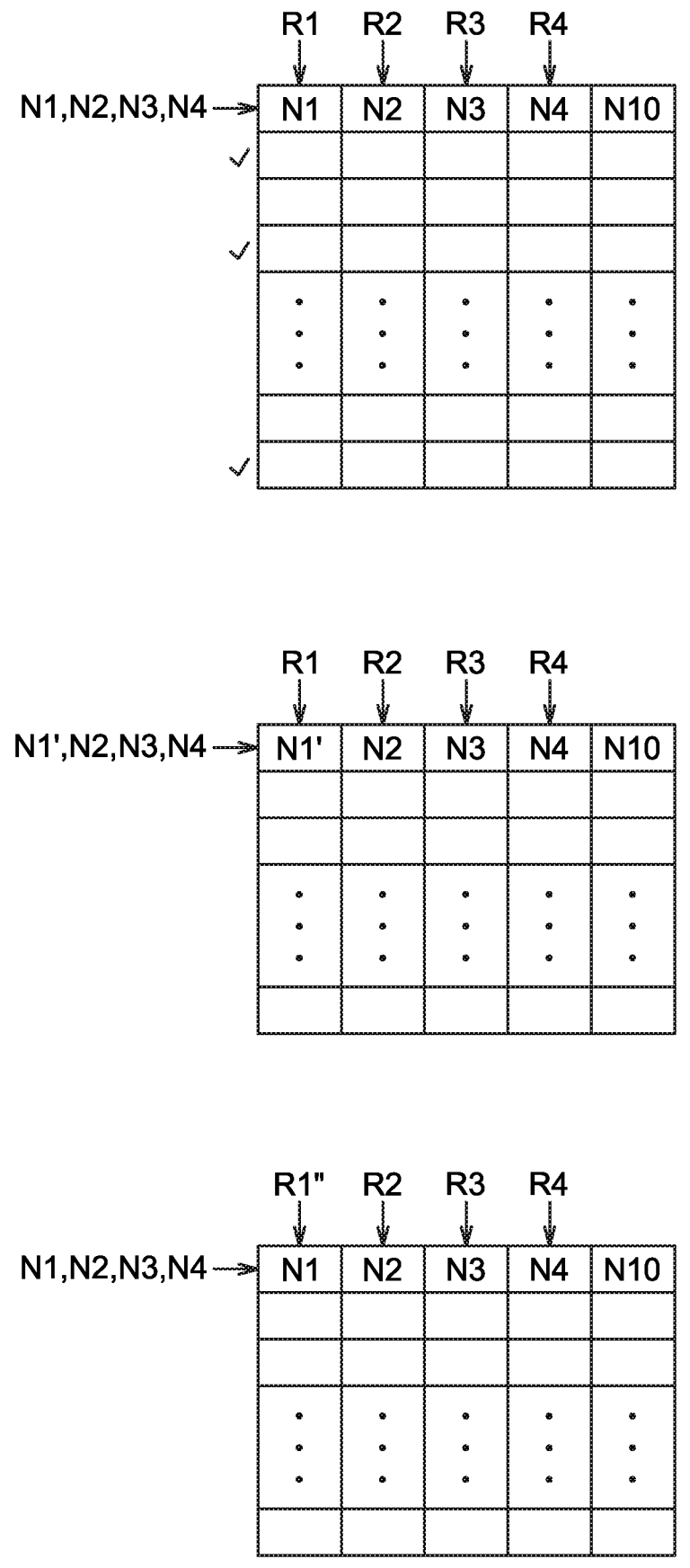

In another embodiment, the arithmetic unit 130 can sample the searched data to reduce the data volume. Referring to FIG. 8, another schematic diagram of reducing the data volume of the searched data is shown. When the data volume is 3/2 times of the average of the predetermined range, the searched data can be sampled at a ratio of 2/3. The sampling procedure is performed as follows. Only 2/3 of the data satisfying the searching condition R1 of the feature N1 are sampled, and the remaining 1/3 are abandoned. Only 2/3 of the data satisfying the searching condition R2 of the feature N2 are sampled, and the remaining 1/3 are abandoned. Only 2/3 of the data satisfying the searching condition R3 of the feature N3 are sampled, and the remaining 1/3 are abandoned. Only 2/3 of the data satisfying the searching condition R4 of the feature N4, 2/3 are sampled, and the remaining 1/3 are abandoned. In FIG. 8, only the ticked items are sampled, and the unticked items are abandoned. Thus, the data volume can be reduced to be 2/3 of the original data volume, and fall in the predetermined range.

After step S130, the data shrink procedure is completed and the method returns to step S120 to repeat the determination procedure.

In step S140, the arithmetic unit 130 increases the data volume of the searched data according to the features. Different methods can be used in step S140 to increase the data volume, and details of these methods are disclosed below.

In an embodiment, the arithmetic unit 130 can elevate the levels of the features to increase the data volume. Referring to FIG. 9, a schematic diagram of increasing the data volume of the searched data is shown. For example, the feature N1, such as "Print Ads Amount", is limited at the searching condition R1 "More Than $300,000". The arithmetic unit 130 can elevate the feature N1 "Print Ads Amount" to the feature N1' "Various Ads amount". Since any TV ads amounts larger than $300,000 will be included, the data volume of the searched data is effectively increased.

In another embodiment, the arithmetic unit 130 can expand the searching condition to increase the data volume. Referring to FIG. 10, another schematic diagram of increasing the data volume of the searched data is shown. The arithmetic unit 130 can expand the searching condition R1 of the feature N1 as the searching condition R1". For example, the searching condition "More Than $300,000" is expanded as "More Than $100,000". Thus, the data volume of the searched data can be effectively increased.

After step S140, the data expand procedure is completed, and the method returns to step S120 to repeat the determination procedure.

In step 150, the analysis unit 140 analyzes a correlation between the features and the event according to the searched data. The analysis unit 140 can analyze the correlation between the features and the event according to the searched data to obtain the data sensor of relevant events by using a machine learning method such as adaptive boosting algorithm, least absolute shrinkage and selection operator (LASSO), or stepwise regression.

In response to the coming of the megadata age, the above embodiments are capable of quickly mining the features that can be used as data sensors through the integration of queries and reducing the complexity in the analysis of megadata. Furthermore, the data shrink procedure can be used to effectively avoid the data volume being too large to handle. Moreover, the data expand procedure can be used to obtain a sufficient volume of data and increase the precision in data sensor mining.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for analyzing data, comprising:
   integrating, by an arithmetic unit, a plurality of queries for an event stored in a database to obtain a plurality of integrated searching features each of which having an integrated searching condition, wherein each of the queries is inputted by a separate user, one of the integrated searching features is a union or an intersection of a plurality of original searching features of the queries, one of the integrated searching condition is a union or an intersection of two original searching conditions corresponding to one of the original searching features, a plurality of items of searched data are obtained from the database according to the integrated searching conditions of the integrated searching features, the step of integrating including:
   (1) forming a union or an intersection of different original searching features, and
   (2) forming a union or an intersection of different original searching conditions corresponding to an identical original searching feature;
   determining, by the arithmetic unit, whether a data volume of the searched data is higher or lower than a predetermined range;
   adjusting, by the arithmetic unit, the integrated searching condition of each of the integrated searching features to reduce the data volume of the searched data if the data volume is higher than the predetermined range;
   adjusting, by the arithmetic unit, the integrated searching condition of each of the integrated searching features to increase the data volume of the searched data if the data volume is lower than the predetermined range; and
   analyzing, by an analysis unit, a correlation between the integrated searching features and the event according to the searched data.

2. The method according to claim 1, wherein the step of reducing the data volume of the searched data comprises:
   eliminating some of the integrated searching features according to a number of times of each of the integrated searching features used in the queries.

3. The method according to claim 1, wherein the step of reducing the data volume of the searched data comprises:
   narrowing the integrated searching conditions of some of the integrated searching features.

4. The method according to claim 1, wherein the step of reducing the data volume of the searched data comprises:
   sampling the searched data.

5. The method according to claim 1, wherein the step of increasing the data volume of the searched data comprises:
   elevating levels of some of the integrated searching features.

6. The method according to claim 1, wherein the step of increasing the data volume of the searched data comprises:
   expanding the integrated searching conditions of some of the integrated searching features.

7. The method according to claim 1, wherein the queries are inputted by at least two users.

8. The method according to claim 1, wherein two of the queries are inputted by the same user.

9. A system for analyzing data, comprising:
   a database;
   a user interface for receiving a plurality of queries for an event from a plurality of users, wherein each of the queries is inputted by a separate user;
   an arithmetic unit connected between the database and the user interface for integrating the queries to obtain a plurality of integrated searching features each of which having an integrated searching condition, wherein one of the integrated searching features is a union or an intersection of a plurality of original searching features of the queries, one of the integrated searching condition is a union or an intersection of two original searching conditions corresponding to one of the original searching features, a plurality of items of searched data are obtained from the database according to the integrated searching conditions of the integrated searching features, and the arithmetic unit adjusts the integrated searching conditions of each of the integrated searching features to reduce a data volume of the searched data if the data volume is higher than a predetermined range, and adjusts the content integrated searching conditions of each of the integrated searching features to increase the data volume of the searched data according to the integrated searching features if the data volume is lower than the predetermined range, the arithmetic unit forming:
   (1) a union or an intersection of different original searching features, and
   (2) a union or an intersection of different original searching conditions corresponding to an identical original searching feature; and
   an analysis unit connected between the database and the arithmetic unit for analyzing a correlation between the integrated searching features and the event according to the searched data.

10. The system according to claim 9, wherein the arithmetic unit eliminates some of the integrated searching features to reduce the data volume of the searched data according to a number of times of each of the integrated searching features used the queries.

11. The system according to claim 9, wherein the arithmetic unit narrows the integrated searching conditions of some of the integrated searching features to reduce the data volume of the searched data.

12. The system according to claim 9, wherein the arithmetic unit samples the searched data to reduce the data volume of the searched data.

13. The system according to claim 9, wherein the arithmetic unit elevates levels of some of the integrated searching features to increase the data volume of the searched data.

14. The system according to claim 9, wherein the arithmetic unit expands the integrated searching conditions of some of the integrated searching features to increase the data volume of the searched data.

15. The system according to claim 9, wherein the queries are inputted by at least two users.

16. The system according to claim 9, wherein two of the queries are inputted by the same user.

* * * * *